(12) United States Patent
Chen

(10) Patent No.: US 6,288,336 B1
(45) Date of Patent: Sep. 11, 2001

(54) COMPUTER BEZEL INCORPORATING A PLURALITY OF FASTENERS

(75) Inventor: Chia Hua Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/473,779

(22) Filed: Dec. 29, 1999

(30) Foreign Application Priority Data

Sep. 17, 1999 (TW) .................................................. 88215997

(51) Int. Cl.[7] ...................................................... H02G 3/14
(52) U.S. Cl. ............................. 174/66; 174/35 R; 174/50
(58) Field of Search ................................... 174/66, 67, 54, 174/17 R, 50, 50.51, 35 R; 312/223.1, 223.2, 265.5, 265.6; 403/326, 327, 329, 321, 325; 24/453

(56) References Cited

U.S. PATENT DOCUMENTS

| D. 420,343 | * | 2/2000 | Jean et al. | D14/115 |
| 3,381,344 | * | 5/1968 | Tinnermann | 24/453 |
| 5,036,567 | * | 8/1991 | Clinch | 24/453 |
| 5,138,529 | * | 8/1992 | Colton et al. | 361/424 |
| 5,267,125 | * | 11/1993 | Liu | 174/51 |
| 5,349,132 | * | 9/1994 | Miller et al. | 174/35 R |
| 5,997,115 | * | 12/1999 | Radloff et al. | 312/222 |
| 6,101,686 | * | 8/2000 | Velthoven et al. | 24/295 |
| 6,160,232 | * | 12/2000 | Lin | 200/341 |

* cited by examiner

Primary Examiner—Dean A. Reichard
Assistant Examiner—Angel R. Estrada
(74) Attorney, Agent, or Firm—Wei Te Chung

(57) ABSTRACT

A computer bezel includes a body and a number of fasteners attached to the body. The body forms a number of positioning tabs. Each fastener includes a base and a latch extending from the base. The base defines a slot and the latch defines a receiving space in communication with the slot to receive the positioning tab of the body for positioning the fastener.

7 Claims, 5 Drawing Sheets

COMPUTER BEZEL INCORPORATING A PLURALITY OF FASTENERS

BACKGROUND OF THE INVENTION

1. Field of the invention

The present invention relates to a computer bezel, and particularly to a computer bezel having a plurality of fasteners for attaching the bezel to a computer panel.

2. The Related Art

A computer bezel is generally attached to a computer enclosure by a plurality of latches thereof engaging with a panel of the computer enclosure. A computer bezel, such as that disclosed in Taiwan Patent Application No. 85202167, integrally forms four latches therearound. A computer enclosure defines four apertures respectively in opposite panels thereof for engagingly receiving the latches thereby fixing the bezel thereto. However, due to the poor resiliency of the latches, detaching the computer bezel from the enclosure is complicated and easily damages the latches.

To counter this problem, a computer bezel with good resilient latches is required. The computer bezel such as disclosed in Taiwan Patent Application No.81214080, includes a plurality of metallic fasteners attached thereto by bolts. Each fastener includes a base and a latch extending from the base. The computer enclosure defines a plurality of slots for engagingly receiving the latches of the fasteners. However, the latch of the fastener is easily deformed during assembly or disassembly procedure. This makes it difficult in assembly or disassembly procedure.

As another example disclosed in U.S. Pat. No. 5,123,680, a fastener for a computer bezel forms a plurality of latches therearound for engaging with a computer enclosure. However, since all the latches are engaged with the computer enclosure in different directions, the fastener is attached to the enclosure so tight that it is cumbersome to detach the fastener from the enclosure.

Thus, it is desired to have a computer bezel having a plurality of fasteners to facilitate the bezel to be attached to or detached from a computer enclosure.

SUMMARY OF THE INVENTION

Accordingly, an object of the present invention is to provide a computer bezel comprising a plurality of fasteners to facilitate the bezel to be attached to or detached from a computer panel.

To fulfill the object mentioned above, a computer bezel in accordance with the present invention includes a body and a plurality of fasteners attached to the body. The body forms a plurality of positioning tabs. Each fastener comprises a base and a latch extending from the base. The base defines a slot and the latch defines a receiving space in communication with the slot to receive the positioning tab of the body for positioning the fastener.

Other objects and advantages of the present invention will be understood from the following description of a preferred embodiment thereof with reference to the accompanying drawings, wherein:

DETAILED DESCRIPTION OF THE PREFERRED EMBODIMENT

Figure 1:
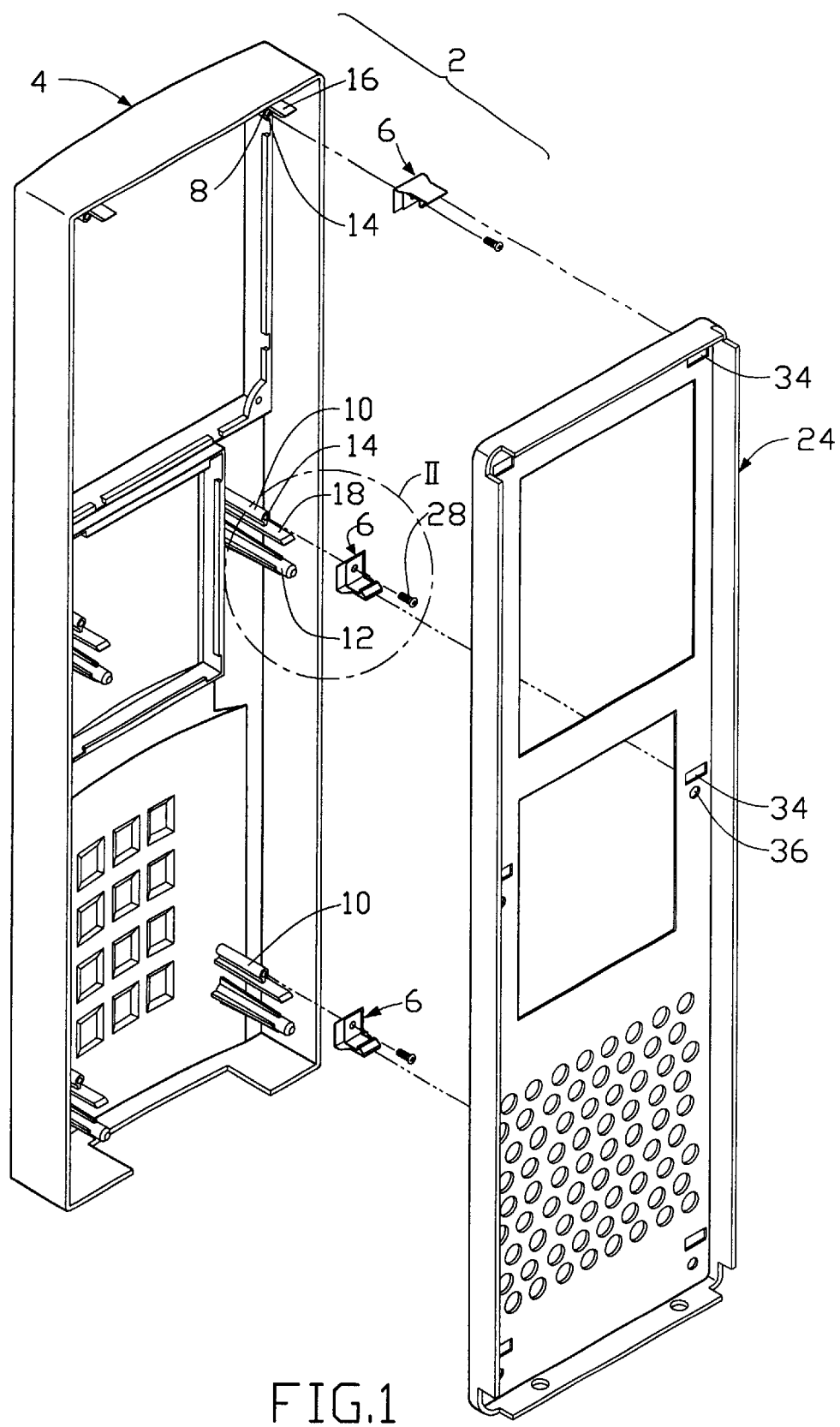
FIG. 1 is an exploded view of a panel and a computer bezel in accordance with the present invention.
Figure 2:
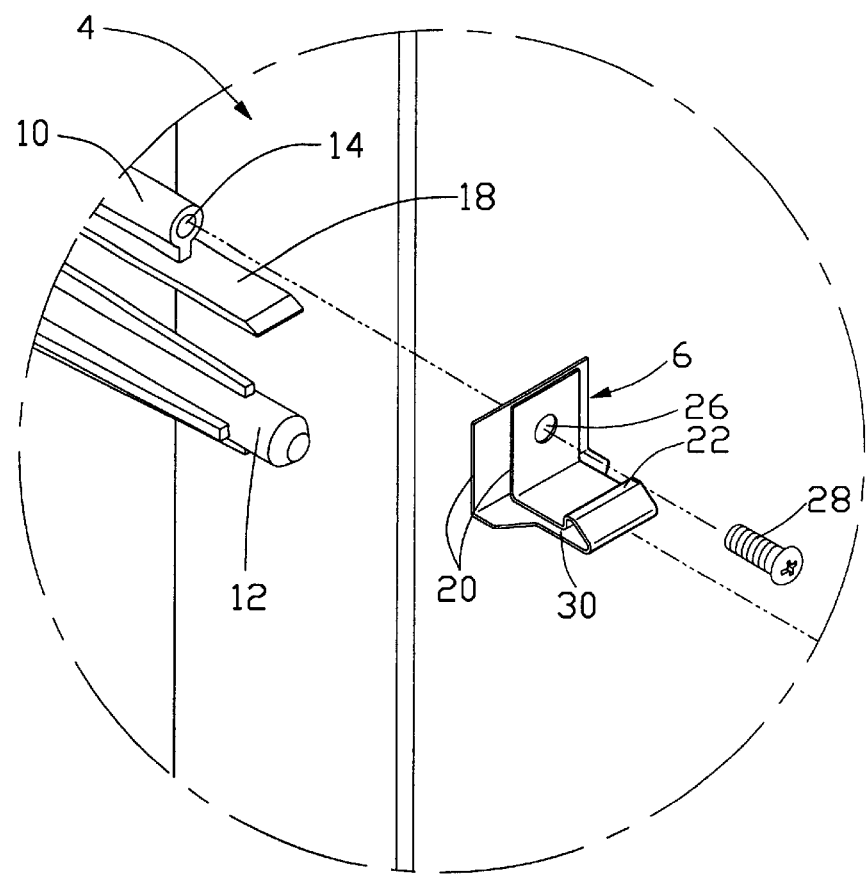
FIG. 2 is an enlarged view of a circled portion II of FIG. 1.
Figure 3:
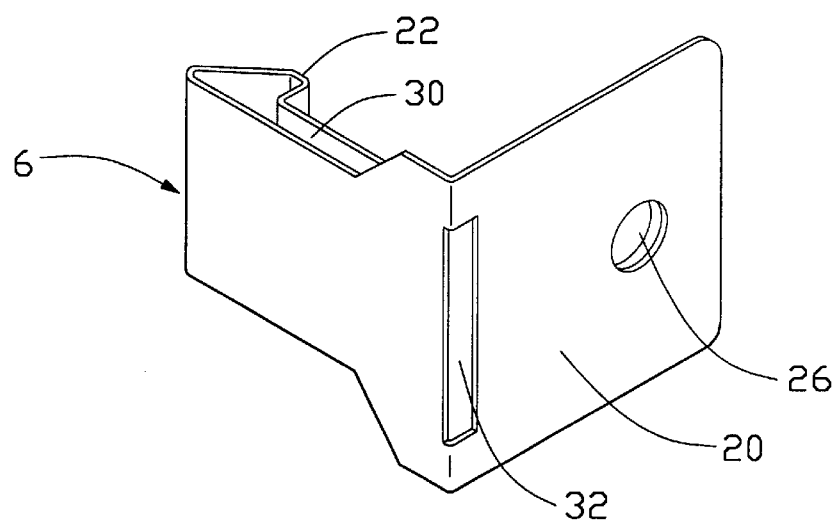
FIG. 3 is a perspective view of a fastener in accordance with the present invention.

Referring to FIGS. 1–3, a computer bezel 2 in accordance with the present invention comprises a body 4 and a plurality of fasteners 6 attached to the body 4. A pair of first fixing protrusions 8 extends from a top portion of the body 4. Two pairs of second fixing protrusions 10 and guiding posts 12 adjacent to the second fixing protrusions 10 extend from middle and lower portions of the body 4. Each of fixing protrusions 8, 10 defines a screw hole 14. Two first positioning tabs 16 extend from the body 4, and each first positioning tab 16 is parallel and connected to each first fixing protrusion 8 and positioned thereabove. Alternatively, though not shown in the figure, the first positioning tab 16 may be made separate from yet proximate to the first fixing protrusion 8. Two pairs of second positioning tabs 18 extend from the body 4, and each second positioning tab 18 is parallel and connected to each second fixing protrusion 10 and positioned thereunder. Alternatively, though not shown in the figure, the second positioning tab 18 may be made separate from yet proximate to the second fixing protrusion 10.

The fastener 6 includes a base 20 for attaching to the body 4 and a latch 22 for engaging with a computer panel 24. The base 20 includes two plates stacked together and defines an aperture 26 through the two plates for extension of a bolt 28 threadedly engaging with the screw hole 14 of either the first fixing protrusion 8 or the second fixing protrusion 10 of the body 4. The latch 22 extends from the two plates of the base 20 and defines a receiving space 30 therein for receiving the first positioning tab 16 (or the second positioning tab 18) of the body 4. A slot 32 is defined in one plate of the base 20 in communication with the receiving space 30 for extension of the first positioning tab 16 (or the second positioning tab 18) of the body 4 into the receiving space 30 thereby positioning the fastener 6 to the body 4.

The panel 24 defines six through holes 34 for engagingly receiving the fasteners 6 of the bezel 2. Four guiding holes 36 are defined in the panel 32 for receiving the guiding posts 12 of the bezel 2.

Figure 4:
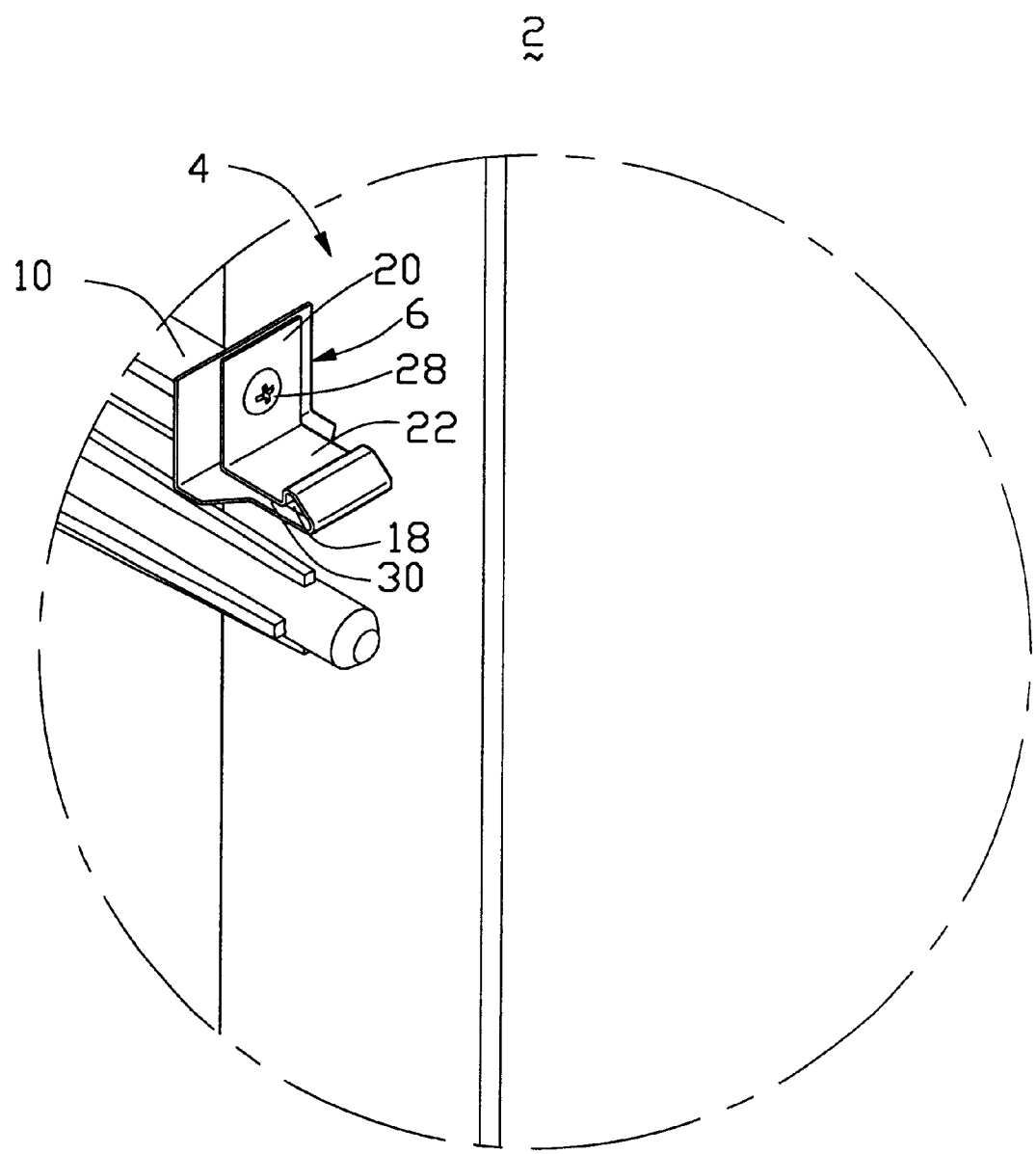
FIG. 4 is an assembled view of FIG. 2.

Referring to FIGS. 2–4, the first and second positioning tabs 16, 18 of the body 4 extend through the slots 32 of the fasteners 6 and are received in the receiving spaces 30 of the fasteners 6 to position the fasteners 6 to the body 4 so as to result in an improved latching device, i.e, the original latches 22 plus the first and second positioning tabs 16, 18 for enhancement thereof. The bolts 28 extend through the apertures 26 of the fasteners 6 and threadedly engage with the screw holes 14 of the fixing protrusions 8, 10 of the body 4. Thus, the fasteners 6 are attached to the body 4.

Figure 5:
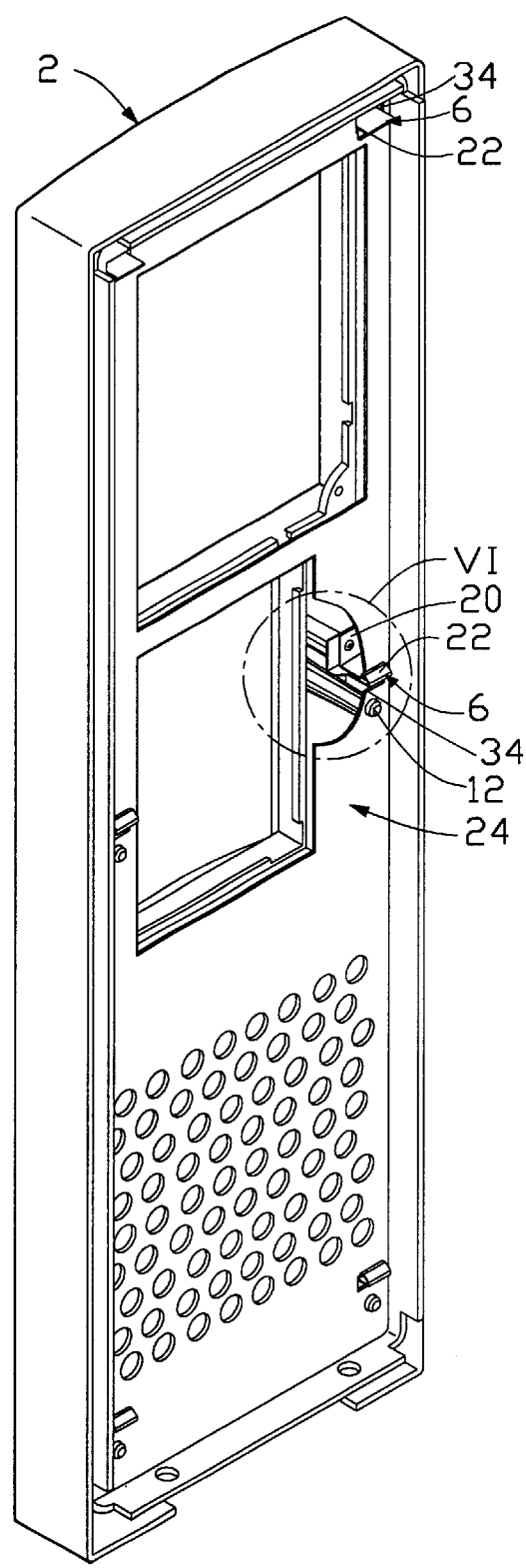
FIG. 5 is an assembled view of FIG. 1.
Figure 6:
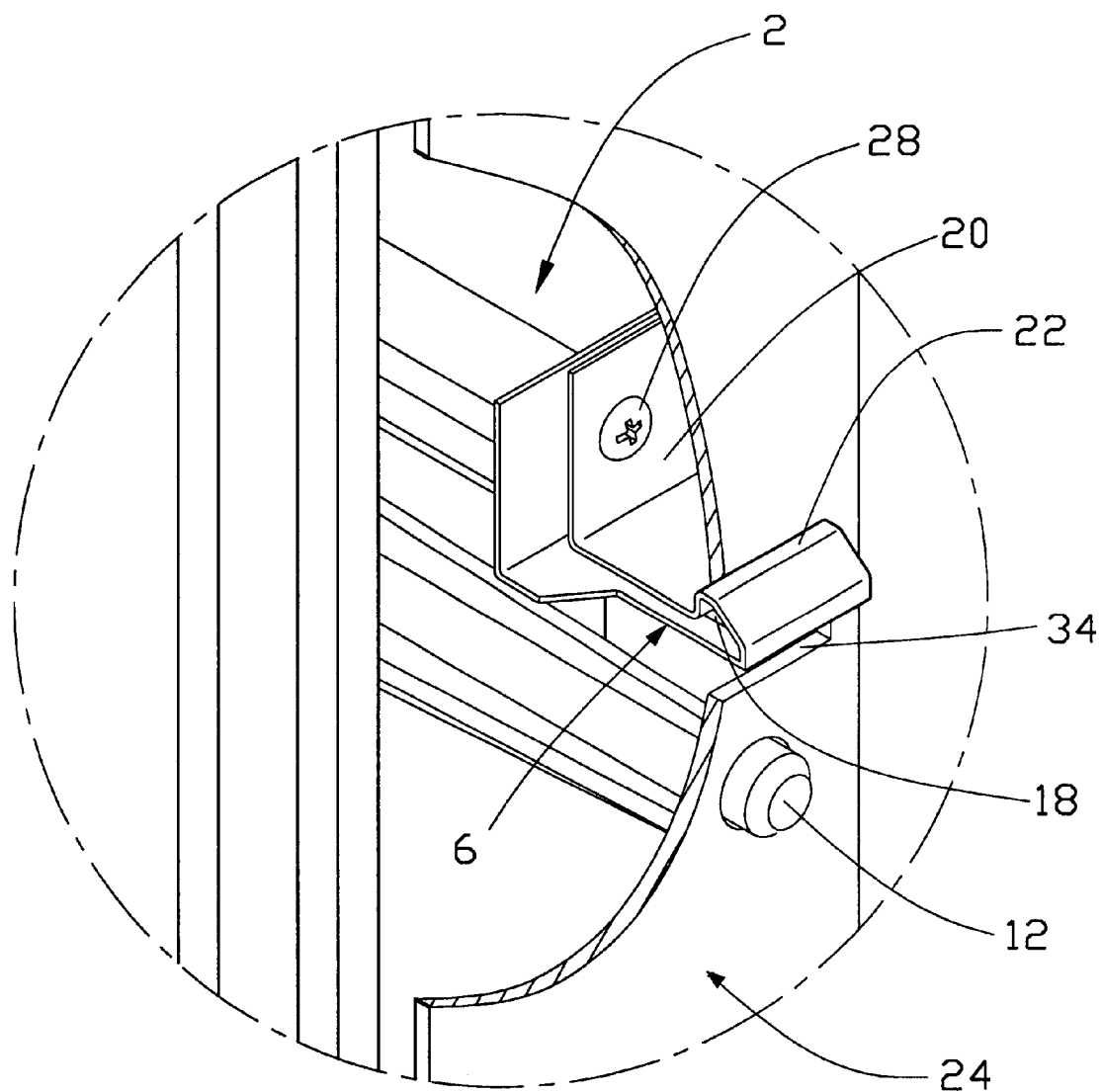
FIG. 6 is an enlarged view of a circled portion VI of FIG. 5.

Referring to FIGS. 5 and 6, the fasteners 6 of the bezel 2 extend through the through holes 34 of the panel 24 with the guiding posts 12 of the bezel 2 extending into the guiding holes 36 of the bezel 2. The latches 22 of the fasteners 6 attached to the first fixing protrusions 8 of the body 4 engage with a lower periphery of the through holes 34 of the panel 24. The latches 22 of the fasteners 6 attached to the second fixing protrusions 10 of the body 4 engage with an upper periphery of the through holes 34 of the panel 24. Since positioned by the positioning tabs 16, 18 of the body 4, the fasteners 6 are prevented from permanently deformation during attachment to the panel 24.

In disassembly, the bottom of the bezel 2 is actuated to pivot the bezel 2 about the pair of top fasteners 6 attached to the first fixing protrusions 8 of the body 4 for detaching the other fasteners 6 from the panel 24. Then the bezel 2 is pushed upwardly and outwardly to detach the top fasteners 6 from the panel 24. Thus, the bezel 2 is easily disassembled from the panel 24. This easy way for disassembling is due to parallel arrangement of the fasteners 6 and each corresponding pair of fastener 6 having their latches 22 facing inwardly to each other.

It will be understood that the present invention may be embodied in other forms without departing from the spirit thereof. The present example and embodiment, therefore, is to be considered in all respects as illustrative and not restrictive, and the invention is not to be limited to the details given herein.

What is claimed is:

1. A computer bezel comprising:

a body forming a plurality of positioning tabs; and a plurality of fasteners attached to the body, each fastener comprising a base and a latch extending from the base, the base defining a slot for extension of a corresponding positioning tab of the body and the latch defining a receiving space in communication with the slot to receive the corresponding positioning tab of the body for positioning the fastener to the body.

2. The computer bezel as described in claim 1, wherein a plurality of screw holes is defined in the body adjacent to the positioning tabs, and wherein the positioning tabs include a pair of first positioning tabs situated above corresponding screw holes and two pairs of second positioning tabs situated under corresponding screw holes.

3. The computer bezel as claimed in claim 1, wherein the base of the fastener comprises two stacked plates.

4. The computer bezel as described in claim 1, wherein a plurality of positioning posts is formed on the body adjacent to the positioning tabs of the body. and are oppositely engaged with the corresponding pair of through holes.

5. A computer bezel comprising:

a body forming a plurality of positioning tabs; and a plurality of fasteners attached to the body, each fastener comprising a base and a latch extending from the base, the base defining a slot and the latch defining a receiving space in communication with the slot to receive the positioning tab of the body for positioning the fastener to the body;

wherein the base of the fastener comprises two stacked plates.

6. The computer bezel as described in claim 5, wherein a plurality of screw holes is defined in the body adjacent to the positioning tabs, and wherein the positioning tabs include a pair of first positioning tabs suited above corresponding screw holes and two pairs of second positioning tabs situated under corresponding screw holes.

7. The computer bezel as described in claim 5, wherein a plurality of positioning posts is formed on the body adjacent to the positioning tabs of the body.

* * * * *